(12) United States Patent
Mckeon et al.

(10) Patent No.: US 10,706,443 B2
(45) Date of Patent: Jul. 7, 2020

(54) DYNAMIC INSERTION OF CONTENT ITEMS INTO RESOURCES

(71) Applicant: Google LLC, Mountain View, CA (US)

(72) Inventors: Matthew Mckeon, Mountain View, CA (US); Sami Mohammed Shalabi, Mountain View, CA (US); Maurice Bennett Shore, Mountain View, CA (US); Abraham Michael Yaar, Mountain View, CA (US)

(73) Assignee: Google LLC, Mountain View, CA (US)

( * ) Notice: Subject to any disclaimer, the term of this patent is extended or adjusted under 35 U.S.C. 154(b) by 114 days.

(21) Appl. No.: 15/948,866

(22) Filed: Apr. 9, 2018

(65) Prior Publication Data
US 2018/0225726 A1 Aug. 9, 2018

Related U.S. Application Data

(63) Continuation of application No. 14/510,252, filed on Oct. 9, 2014, now Pat. No. 9,940,646.

(51) Int. Cl.
*G06Q 30/02* (2012.01)
*G06F 16/957* (2019.01)
*G06K 9/00* (2006.01)

(52) U.S. Cl.
CPC ..... *G06Q 30/0277* (2013.01); *G06F 16/9577* (2019.01); *G06K 9/00463* (2013.01)

(58) Field of Classification Search
CPC ..................................................... G06Q 30/02
See application file for complete search history.

(56) References Cited

U.S. PATENT DOCUMENTS

| | | | |
|---|---|---|---|
| 6,336,124 B1 * | 1/2002 | Alam ................. | G06F 17/2229 715/205 |
| 9,460,530 B2 | 10/2016 | Dougherty et al. | |
| 2002/0116421 A1 | 8/2002 | Fox et al. | |

(Continued)

OTHER PUBLICATIONS

U.S. Notice of Allowance on U.S. Appl. No. 14/510,252 dated Dec. 7, 2017.

(Continued)

*Primary Examiner* — Vincent M Cao
(74) *Attorney, Agent, or Firm* — Foley & Lardner LLP

(57) ABSTRACT

Methods, systems, and apparatus include computer programs encoded on a computer-readable storage medium, including a method for providing content. Publisher input is received regarding acceptable content item types and sizes for inclusion with other content in a publication. Publisher input is received regarding how often content items are to appear in the publication. Identification is received of a user device that will render the publication as an article. The other content is evaluated including formatting the article as a single scrolling page, including defining logical pages with boundaries determined by formatted content blocks and based on display capabilities of the user device. Based on the evaluating, content items are selected for presentation along with the other content when presenting the article on the user device, including dynamically determining a number, types and placement of content items based on the logical pages and properties of the user device.

20 Claims, 5 Drawing Sheets

(56) References Cited

U.S. PATENT DOCUMENTS

| | | | |
|---|---|---|---|
| 2007/0061243 A1* | 3/2007 | Ramer | G06Q 10/10 |
| | | | 705/37 |
| 2008/0052166 A1 | 2/2008 | Warmus et al. | |
| 2008/0243601 A1 | 10/2008 | Patel et al. | |
| 2008/0270883 A1* | 10/2008 | Friedman | G06Q 10/10 |
| | | | 705/14.46 |
| 2009/0144654 A1* | 6/2009 | Brouwer | G06Q 30/02 |
| | | | 715/802 |
| 2010/0175079 A1* | 7/2010 | Braun | G06Q 30/02 |
| | | | 725/32 |
| 2010/0222046 A1* | 9/2010 | Cumming | G06Q 30/02 |
| | | | 455/418 |
| 2010/0228712 A1* | 9/2010 | Wexler | G06Q 30/02 |
| | | | 707/706 |
| 2010/0315326 A1* | 12/2010 | Le Chevalier | G06F 9/451 |
| | | | 345/107 |
| 2013/0159823 A1* | 6/2013 | Ri | G06F 17/00 |
| | | | 715/204 |

OTHER PUBLICATIONS

U.S. Office Action on U.S. Appl. No. 14/510,252 dated Jun. 15, 2017.
Notification Prior to Examination for application No. 229412 dated Jun. 29, 2015.

\* cited by examiner

DYNAMIC INSERTION OF CONTENT ITEMS INTO RESOURCES

CROSS-REFERENCE TO RELATED APPLICATIONS

This application is a continuation of, and claims priority to, pending U.S. application Ser. No. 14/510,252, filed Oct. 9, 2014, entitled "DYNAMIC INSERTION OF CONTENT ITEMS INTO RESOURCES', which claims priority to Israel Application No. 229412, filed on Nov. 13, 2013. The disclosure of the foregoing applications is incorporated herein by reference.

BACKGROUND

This specification relates to information presentation.

The Internet provides access to a wide variety of resources. For example, video and/or audio files, as well as webpages for particular subjects or particular news articles, are accessible over the Internet. Access to these resources presents opportunities for other content (e.g., advertisements) to be provided with the resources. For example, a webpage can include slots in which content can be presented. These slots can be defined in the webpage or defined for presentation with a webpage, for example, along with search results. Content in these examples can be of various formats, while the devices that consume (e.g., present) the content can be equally varied in terms of their type and capabilities.

Content slots can be allocated to content sponsors as part of a reservation system, or in an auction. For example, content sponsors can provide bids specifying amounts that the sponsors are respectively willing to pay for presentation of their content. In turn, an auction can be run, and the slots can be allocated to sponsors according, among other things, to their bids and/or a likelihood that the user will interact with the content presented. Content can be presented in different ways on different types of devices.

SUMMARY

In general, one innovative aspect of the subject matter described in this specification can be implemented in methods that include a computer-implemented method for selecting content. The method includes receiving publisher input regarding acceptable content item types and sizes for inclusion along with other content in a given publication. The method further includes receiving publisher input regarding how often content items are to appear in the publication. The method further includes receiving an identification of a user device that will render the publication as an article. The method further includes evaluating, by one or more processors, the other content including formatting the article as a single scrolling page including defining one or more logical pages with boundaries determined by formatted content blocks and based on display capabilities of the user device. The method further includes, based on the evaluating, selecting one or more content items for presentation along with the other content when presenting the article on the user device, including dynamically determining a number of content items, types of content items, and placement of content items based at least in part on the logical pages and properties associated with the displaying user device.

These and other implementations can each optionally include one or more of the following features. The method can further include providing the selected one or more content items for presentation along with the other content on the user device. The acceptable content types can include full-page content items, banner content items or a predetermined size of rectangle content items. The full-page content items can include plural different-sized items including ones sized for mobile telephones or tablet devices when configured in portrait or landscape orientation. The publisher input regarding how often content items are to appear can include publisher input for how many content items are to be included per article and how often content items should be included with a given article, wherein how often is less than every article. Formatting can include formatting the article as a single vertically scrolling page, and defining one or more logical pages can include defining content blocks in the other content which define content that is not to be separated on different pages and determining the number of logical pages based on the defined content blocks and the user device's display size and capabilities. Evaluating can include determining that the number of logical pages is less than a first threshold, and evaluating can include determining that the number of content items should be only 1 and that the content item should be placed at an end of the other content on a last page. Evaluating can include determining that the number of logical pages is more than a predetermined first minimum number, and the method can further include determining a size associated with a display of the user device, wherein selecting includes: when the determined size is less than a predetermined threshold, selecting content items that are full-width, and when the determined size is greater than the predetermined size, selecting content items that are less than full width. When selecting content items that are less than full width the method can further include dynamically determining a placement of the content items including locating the content items in different positions on pages of the article. The different positions can alternate on consecutive pages where content items are shown. Dynamically determining a placement can include shifting horizontally or vertically each content item placement on respective pages depending on a formatting or type of content that surrounds the content item. Evaluating can include determining that the number of logical pages is more than a predetermined second minimum number, and the method can further include selecting an interstitial content item based on a size and aspect ratio of a display associated with the user device to optimally match the user device. Dynamically determining the type of content items can further include determining only one type of content item per article.

In general, another innovative aspect of the subject matter described in this specification can be implemented in computer program products that include a computer program product tangibly embodied in a computer-readable storage device and comprising instructions. The instructions, when executed by one or more processors, cause the processor to: receive publisher input regarding acceptable content item types and sizes for inclusion along with other content in a given publication; receive publisher input regarding how often content items are to appear in the publication; receive an identification of a user device that will render the publication as an article; evaluate, by one or more processors, the other content including formatting the article as a single scrolling page including defining one or more logical pages with boundaries determined by formatted content blocks and based on display capabilities of the user device; and based on the evaluating, select one or more content items for presentation along with the other content when presenting the article on the user device, including dynamically determining a number of content items, types of content items, and placement of content items based at least in part on the logical pages and properties associated with the displaying user device.

These and other implementations can each optionally include one or more of the following features. The instructions can further include instructions to provide the selected one or more content items for presentation along with the other content on the user device. The acceptable content types can include full-page content items, banner content items or a predetermined size of rectangle content items. The full-page content items can include plural different-sized items including ones sized for mobile telephones or tablet devices when configured in portrait or landscape orientation. The publisher input regarding how often content items are to appear can include publisher input for how many content items are to be included per article and how often content items should be included with a given article, wherein how often is less than every article. Formatting can include formatting the article as a single vertically scrolling page, and defining one or more logical pages can include defining content blocks in the other content which define content that is not to be separated on different pages and determining the number of logical pages based on the defined content blocks and based on the display capabilities of the user device.

In general, another innovative aspect of the subject matter described in this specification can be implemented in systems, including a system for selecting content. The system includes a publisher preferences engine for receiving and processing publisher input regarding acceptable content item types and sizes for inclusion along with other content in a given resource, the publisher input also specifying how often content items are to appear in the resource. The system further includes a device identification engine for identifying a user device that will render the resource as an article, including identifying a type of the user device, and including determining display capabilities of a device type associated with the user device. The system further includes a resource evaluation engine for evaluating the resource, including formatting the resource as a single scrolling page that includes logical pages having boundaries determined by formatted content blocks and based on the display capabilities of the user device, wherein each of the formatted content blocks includes a portion of the resource that will fit in each of the logical pages based at least in part on the display capabilities of the device type. The system further includes a content item selection engine for selecting one or more content items for presentation along with a resource, the selection based at least in part on an evaluation of the resource and properties associated with the user device on which the content items will be presented with the resource.

Particular implementations may realize none, one or more of the following advantages. Content sponsors can elect to have different content items (e.g., advertisements) presented or dynamically adjusted content items presented depending on the device used to present their content (e.g., based on size and the capabilities of the device on which a resource that includes the content is to be presented). Publishers can specify presentation parameters that control the number, type and placement of content items (e.g., advertisements) in their resources. A serving system can avoid wasting advertisement impressions on formats that are unlikely to be viewed (e.g., banners at the end of a long article) or skimmed over (e.g., advertisements at the top of an article).

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This document describes systems, methods, computer program products and mechanisms for providing dynamically-selected and placed content items (e.g., advertisements) within a resource (e.g., a publisher's publication, such as a web page). For example, a publisher can specify that a publisher resource is to be provided with content items that are dynamically selected and/or configured, as described herein. Publisher inputs associated with the resource can specify when and how third-party content items, such as advertisements, are to be included with the resource. The publisher inputs can include designations of acceptable content item sizes for use in presenting the content items with the resource on different types of user devices (e.g., having different display capabilities) and for different orientations (e.g., landscape versus portrait). When the resource is to be presented, content items are dynamically selected and positioned within the resource, and the resource and content items are presented together, for example, in the form of a multi-page article. The article, for example, can have the content items interspersed on logical pages in predetermined ways, after being selected dynamically based on the type of the user device. For example, the systems and methods proposed can be used to distribute and locate advertisements in association with other content without overwhelming the user, including potentially deferring the presentation of advertisements (e.g., to pages on which the user is likely to respond favorably to the advertisements) and providing an aesthetically pleasing user experience.

Figure 1:
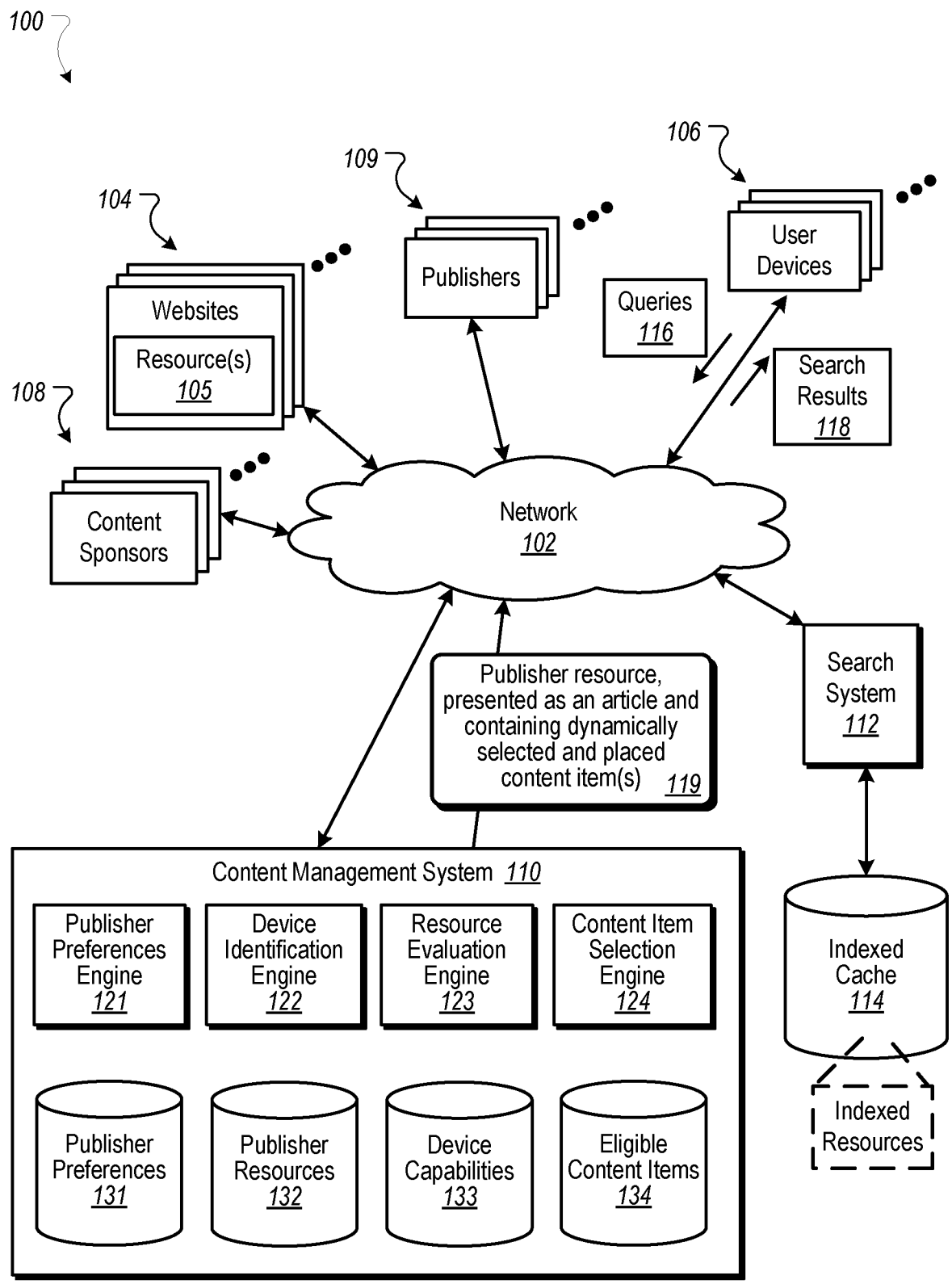
FIG. 1 is a block diagram of an example environment for delivering content.

FIG. 1 is a block diagram of an example environment 100 for delivering content. The example environment 100 includes a content management system 110 for selecting and providing content in response to requests for content. The example environment 100 includes a network 102, such as a local area network (LAN), a wide area network (WAN), the Internet, or a combination thereof. The network 102 connects websites 104, user devices 106, content sponsors 108 (e.g., advertisers), publishers 109, and the content management system 110. The example environment 100 may include many thousands of websites 104, user devices 106, content sponsors 108 and publishers 109.

In some implementations, the environment 100 can be used to identify and provide a publisher resource 119, such as a publisher-provided webpage. The publisher resource 119 can be presented, for example, as an article and can contain dynamically selected and placed content items (e.g., advertisements embedded within the resource). The selection and placement of the content items can depend, for example, on the amount of content in the resource (e.g., number of rendered pages) and the device type and orientation of the user device on which the publisher resource 119 is to be presented. Selection and placement of the content items can further depend on publisher inputs identifying, for example, the publisher's preferences for when and how content items should be included with the resource.

The environment 100 can include plural data stores, which can be stored locally by the content management system 110, stored somewhere else and accessible using the network 102, generated as needed from various data sources, or some combination of these. A data store of publisher preferences 131, for example, can include information about publisher preferences regarding acceptable content item types and sizes for inclusion along with other content in a specific resource. For example, the preferences can indicate the types and sizes of eligible content items that are to be selected and presented with the specific resource. The data store of publisher preferences 131 can also include, for example, information based on publisher inputs regarding how often content items are to appear in the resource. For example, the information can indicate, for any one specific resource, that content items (e.g., advertisements) are to be included in every presentation of the publisher's resource, every second presentation, every third presentation, or some other presentation schedule. Other examples of publisher preferences can include a number of content items to include in a single instance of a presented resource. A data store of publisher resources 132, for example, can include the resources (e.g., web pages) that are published by the publisher. In some implementations, the publisher resources 132 and the publisher preferences 131 can be stored together, or can be cross-referenced by publisher and resource identifier.

A data store of device capabilities 133, for example, can include screen dimensions and other device-specific information for each of a plurality of different types of user devices 106. For example, the information can be used to determine how many lines and/or characters can be presented in one screenful (or logical page) using a specific font on a specific device. The information can be used, for example, to estimate a number of pages that will be required for a resource presented on a specific device and to help determine positions in a presented resource for logical page breaks.

A data store of eligible content items 134, for example, can include advertisements and other content items that can be provided by the content management system 110 in response to a request. The request, for example, can be a request for a single content item to fill a slot. In some implementations, the request can be for one or more content items to be dynamically chosen and presented with a particular resource.

The content management system 110 can include plural engines, some or all of which may be combined or separate, and may be co-located or distributed (e.g., connected over the network 102). A publisher preferences engine 121, for example, can receive and process publisher input regarding acceptable content item types and sizes for inclusion along with other content in a given publication (e.g., of a resource). The publisher information can also specify how often or how many content items are to appear in the resource.

A device identification engine 122, for example, can identify a user device that will render a resource as an article. The identification can include identifying the type of the user device, including determining the device's display/presentation capabilities based on the device type.

A resource evaluation engine 123, for example, can evaluate a resource, including formatting the resource as a single scrolling page that includes logical pages having boundaries determined by formatted content blocks and based on display capabilities of a user device. For example, each of the formatted content blocks can include the portion of the resource that will fit in each of the logical pages, based on display capabilities of the type of device on which the resource and content items are to be presented.

A content item selection engine 124, for example, can select one or more content items for presentation along with a resource. The selection of the content items can be made, for example, based on an evaluation of the resource and properties associated with the user device on which the content items will be presented with the resource.

A website 104 includes one or more resources 105 associated with a domain name and hosted by one or more servers. An example website is a collection of webpages formatted in hypertext markup language (HTML) that can contain text, images, multimedia content, and programming elements, such as scripts. Each website 104 can be maintained by a content publisher, which is an entity that controls, manages and/or owns the website 104.

A resource 105 can be any data that can be provided over the network 102. A resource 105 can be identified by a resource address that is associated with the resource 105. Resources include HTML pages, word processing documents, portable document format (PDF) documents, images, video, and news feed sources, to name only a few. The resources can include content, such as words, phrases, images, video and sounds, that may include embedded information (such as meta-information hyperlinks) and/or embedded instructions (such as JavaScript™ scripts).

A user device 106 is an electronic device that is under control of a user and is capable of requesting and receiving resources over the network 102. Example user devices 106 include personal computers (PCs), televisions with one or more processors embedded therein or coupled thereto, set-top boxes, mobile communication devices (e.g., smartphones), tablet computers and other devices that can send and receive data over the network 102. A user device 106 typically includes one or more user applications, such as a web browser, to facilitate the sending and receiving of data over the network 102.

A user device 106 can request resources 105 from a website 104. In turn, data representing the resource 105 can be provided to the user device 106 for presentation by the user device 106. The data representing the resource 105 can also include data specifying a portion of the resource or a portion of a user display, such as a presentation location of a pop-up window or a slot of a third-party content site or webpage, in which content (e.g., third-party content) can be presented. These specified portions of the resource or user display are referred to as slots (e.g., ad slots).

To facilitate searching of these resources, the environment 100 can include a search system 112 that identifies the resources by crawling and indexing the resources provided by the content publishers on the websites 104. Data about the resources can be indexed based on the resource to which the data corresponds. The indexed and, optionally, cached copies of the resources can be stored in an indexed cache 114.

User devices 106 can submit search queries 116 to the search system 112 over the network 102. In response, the search system 112 can, for example, access the indexed cache 114 to identify resources that are relevant to the search query 116. The search system 112 identifies the resources in the form of search results 118 and returns the search results 118 to the user devices 106 in search results pages. A search result 118 can be data generated by the search system 112 that identifies a resource that is provided in response to a particular search query, and includes a link to the resource. In some implementations, the search results 118 include the content itself, such as a map, or an answer, such as in response to a query for a store's products, phone number, address or hours of operation. In some implementations, the content management system 110 can generate search results 118 using information (e.g., identified resources) received from the search system 112. An example search result 118 can include a webpage title, a snippet of text or a portion of an image extracted from the webpage, and the Universal Resource Locator (URL) of the webpage. Search results pages can also include one or more slots in which other content items (e.g., advertisements) can be presented. In some implementations, slots on search results pages or other webpages can include content slots for content items that have been provided as part of a reservation process. In a reservation process, a publisher and a content item sponsor enter into an agreement where the publisher agrees to publish a given content item (or campaign) in accordance with a schedule (e.g., provide 1000 impressions by date X) or other publication criteria. In some implementations, content items that are selected to fill the requests for content slots can be selected based, at least in part, on priorities associated with a reservation process (e.g., based on urgency to fulfill a reservation).

When a resource 105, search results 118 and/or other content (e.g., a video) are requested by a user device 106, the content management system 110 receives a request for content. The request for content can include characteristics of the slots that are defined for the requested resource or search results page, and can be provided to the content management system 110.

For example, a reference (e.g., URL) to the resource for which the slot is defined, a size of the slot, and/or media types that are available for presentation in the slot can be provided to the content management system 110 in association with a given request. Similarly, keywords associated with a requested resource ("resource keywords") or a search query 116 for which search results are requested can also be provided to the content management system 110 to facilitate identification of content that is relevant to the resource or search query 116.

Based at least in part on data included in the request, the content management system 110 can select content that is eligible to be provided in response to the request ("eligible content items"). For example, eligible content items can include eligible ads having characteristics matching the characteristics of ad slots and that are identified as relevant to specified resource keywords or search queries 116. In some implementations, the selection of the eligible content items can further depend on user signals, such as demographic signals, behavioral signals or other signals derived from a user profile.

For situations in which the systems discussed here collect information about users, or may make use of information about users, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that certain information about the user is removed. For example, a user's identity may be treated so that no identifying information can be determined for the user, or a user's geographic location may be generalized where location information is obtained (such as to a city, ZIP code, or state level), so that a particular location of a user cannot be determined. Thus, the user may have control over how information is collected about the user and used by a content server.

The content management system 110 can select from the eligible content items that are to be provided for presentation in slots of a resource or search results page based at least in part on results of an auction (or by some other selection process). For example, for the eligible content items, the content management system 110 can receive offers from content sponsors 108 and allocate the slots, based at least in part on the received offers (e.g., based on the highest bidders at the conclusion of the auction or based on other criteria, such as those related to satisfying open reservations and a value of learning). The offers represent the amounts that the content sponsors are willing to pay for presentation (or selection or other interaction with) of their content with a resource or search results page. For example, an offer can specify an amount that a content sponsor is willing to pay for each 1000 impressions (i.e., presentations) of the content item, referred to as a CPM bid. Alternatively, the offer can specify an amount that the content sponsor is willing to pay (e.g., a cost per engagement) for a selection (i.e., a click-through) of the content item or a conversion following selection of the content item. For example, the selected content item can be determined based on the offers alone, or based on the offers of each content sponsor being multiplied by one or more factors, such as quality scores derived from content performance, landing page scores, a value of learning, and/or other factors.

A conversion can be said to occur when a user performs a particular transaction or action related to a content item provided with a resource or search results page. What constitutes a conversion may vary from case-to-case and can be determined in a variety of ways. For example, a conversion may occur when a user clicks on a content item (e.g., an ad), is referred to a webpage, and consummates a purchase there before leaving that webpage. A conversion can also be defined by a content provider to be any measurable or observable user action, such as downloading a white paper, navigating to at least a given depth of a website, viewing at least a certain number of webpages, spending at least a predetermined amount of time on a web site or webpage, registering on a website, experiencing media, or performing a social action regarding a content item (e.g., an ad), such as republishing or sharing the content item. Other actions that constitute a conversion can also be used.

Figure 2A:
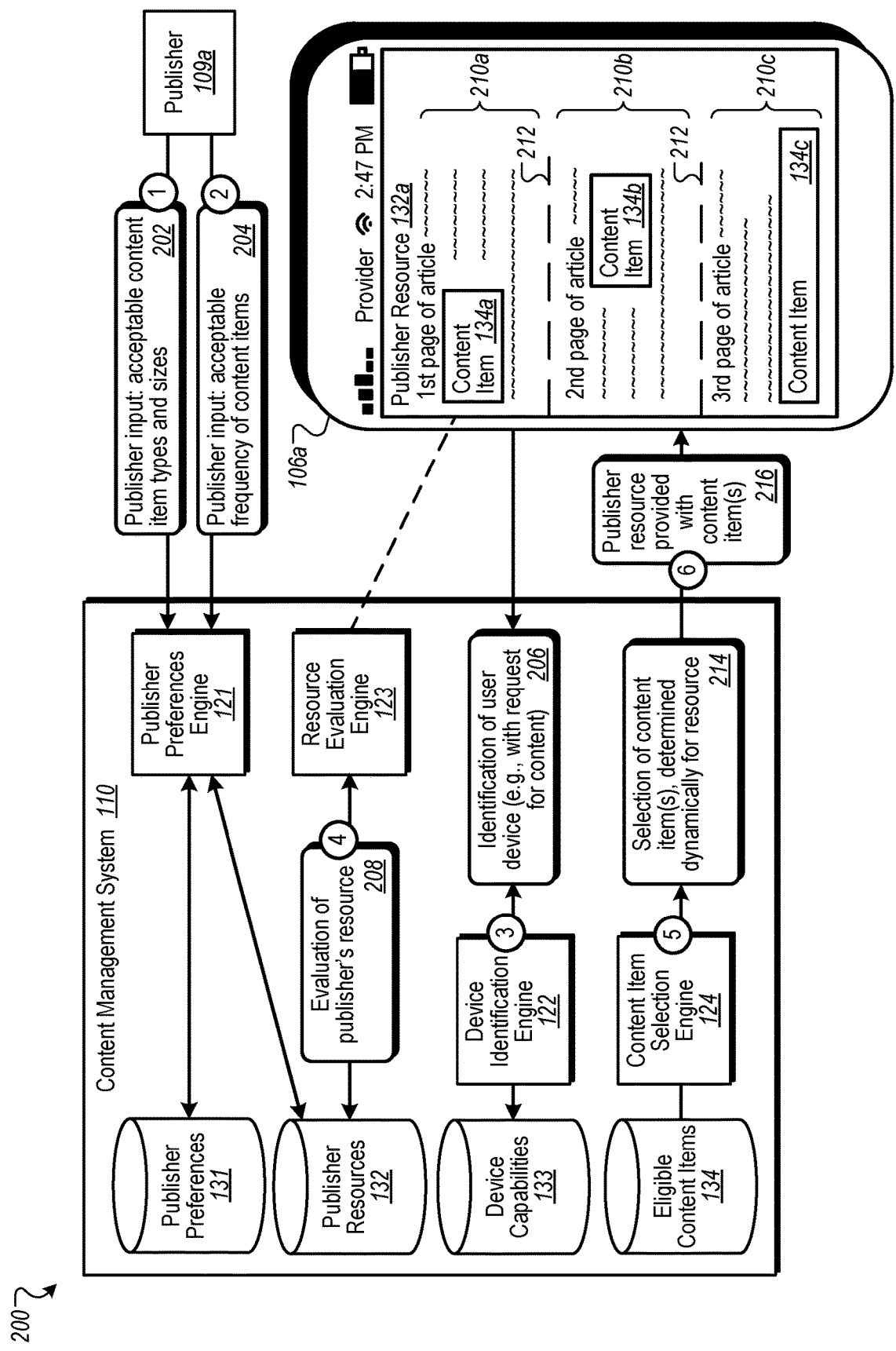
FIG. 2A shows an example system for dynamically selecting content items for presentation with a resource.

FIG. 2A shows an example system 200 for dynamically selecting content items for presentation with a resource. For example, in the system 200, a publisher's resource 132a can be presented on a user device 106a as an article that includes multiple logical pages 210a. The logical pages 210a, for example, can include content items 134a-134c that are selected and positioned based on the amount of content in the resource 132a and the resulting number of logical pages determined for presenting the resource 132a on the user device 106a, and further depending on the device's type and display capabilities. In some implementations, providing content within the system 200 can occur in the following example sequence of stages.

At stage 1, for example, the publisher preferences engine 121 can receive publisher input 202 regarding acceptable content item types and sizes for inclusion along with other content in a given resource. For example, using a user interface (not shown in FIG. 2A), the publisher 109a can specify types and sizes of eligible content items 134 (e.g., advertisements) that are to be included with the publisher resource 132a. Example preferences can specify, for example, that for a particular publisher resource 132 that is under two pages when presented on certain mobile devices having small viewports, the resource is to include a single content item. For example, the preferences can specify that a banner advertisement is to appear at the bottom of the second page. In another example, on long articles (e.g., five or more pages), the preferences can identify which pages will include an advertisement and specify the advertisement's orientation. Orientations of content items can include, for example, the content item being embedded flush left in the article, embedded flush right in the article, a banner at the bottom of a page, and/or other placements and combinations. In some implementations, the preferences can be general preferences of the publisher 109a, or can be associated with one or more specific publisher resources 132 associated with the publisher 109a.

At stage 2, for example, the publisher preferences engine 121 can receive publisher input 204 regarding how often content items are to appear in the publication. For example, for one or more specific publisher resources 132, the publisher 109a can designate how often advertisements are to be presented with their resources or how many content items are to be included in a single resource. The publisher 109a can specify, for example, that advertisements are to be included in every presentation of the publisher resource 132a, every second presentation, every third presentation, or some other presentation schedule. In some implementations, more than one presentation schedule can be specified for a given publisher resource, e.g., different presentation schedules for different device types (e.g., smartphones, tablet computers, laptop computers, and other devices). In some implementations, preferences provided by the publisher 109a, e.g., from publisher inputs 202 and 204, can be stored in publisher preferences 131. Other types of publisher inputs and preferences are possible.

At stage 3, for example, the device identification engine 122 can identify (206) the user device 106a as the user device that will render the resource 132a as an article. For example, a request for content that is received from the user device 106a by the content management system 110 can include information that identifies the type of user device (e.g., smartphone, tablet computer, laptop computer, or some other device). In some implementations, the device identification engine 122 can look up information in the device capabilities 133 to determine, for example, how many pages the publisher resource 132a will occupy on the user device 106a based on the associated device type.

At stage 4, for example, the resource evaluation engine 123 can evaluate (208) the resource 132a, including formatting the resource 132a as a single scrolling page. For example, the resource 132a can be formatted into logical pages 210a-210c that have boundaries 212 determined by formatted content blocks and based on display capabilities of the user device 106a. Each of the formatted content blocks in this example can include the portion of the resource 132a that will fit in each of the logical pages 210a-210c, based on display capabilities of the type of device. In some implementations, evaluation of the resource 132a can consider the combined sizes of a portion of the resource 132a and slot sizes for whichever ones of the content items 134a-134c (e.g., advertisements) are selected to appear on the same logical page 210a-210c.

At stage 5, for example, the content item selection engine 124 can select (214) one or more content items for presentation along with the resource 132a. The selection can be made based on the evaluation of the resource 132a, e.g., to combine content of the resource 132 with the content items 134a-134c for presentation of the resource as an article on the user device 106a. Selecting the content items can include dynamically determining a number of content items, types of content items, and placement of content items based at least in part on the logical pages 210a-210c and properties associated with the displaying user device 106a.

At stage 6, for example, the content management system 110 can optionally provide (216) the content items 134a-134c for presentation with the resource 132a. As an example, the content items 134a-134c can be provided in response to requests for content associated with the resource 132a. However, this is different from conventional resources that have fixed locations for content item slots. By comparison, the system 200 can treat the resource 132a as an article and dynamically select content items based on logical pages 210a-210c and the content that is to appear on each page. In some implementations, at the time that the request for content is received, information received with request can identify the resource 132a as a resource for which content items are to be selected dynamically, as described herein.

Figure 2B:
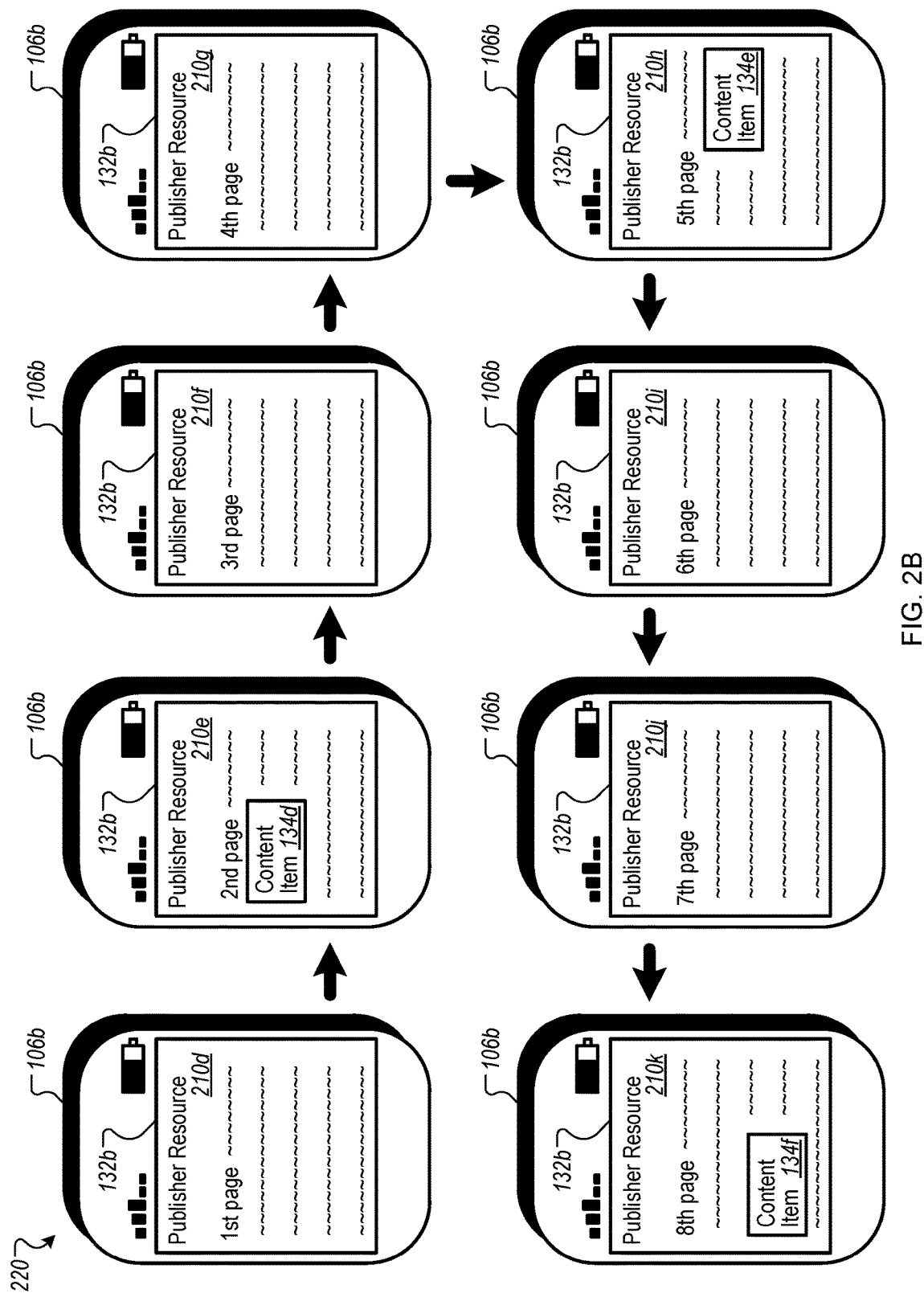
FIG. 2B shows an example sequence of logical pages for a presented resource.

FIG. 2B shows an example sequence 220 of logical pages 210d-210k for a presented resource 132b. In this example, the number of pages in the sequence 220 of logical pages 210d-210k can be the result of the resource evaluation engine 123 evaluating the resource 132b and determining that the number of logical pages 210d-210k is eight, e.g., when content items 134d-134f are included. The selection of the logical pages 210d-210k in this example can be based on whatever device type and display capabilities are associated with the device 106b, e.g., a smartphone.

In some implementations, the resource evaluation engine 123 can use presentation rules for selecting and placing content items within predetermined numbers of logical pages. For example, for long articles (e.g., resources 132 having five or more logical pages), presentation rules can specify that eligible content items 134 are to be included on second, fifth and eighth logical pages, e.g., logical pages 210e, 210h and 210k. This pattern can be consistent, for example, with a policy of including no more than four content items (e.g., advertisements) in total with a resource, and placing the content items on every third logical page, but not on the first logical page. Other sequences and presentation patterns can be used.

In some implementations, placement of the content items can vary among the logical pages. For example, content item 134d can be presented flush-left on the logical page 210e, with content of the resource 132b wrapping around the content item 134d. On the logical page 210h, for example, the content item 134e can be presented on the right side, with the content of the resource 132b wrapping around the left side of the content item 134e. Finally, on the logical page 210k, for example, the content item 134f can be presented on the left side, but lower than the presentation of the content item 134d on the logical page 210e. In some implementations, placement of content items on a resource can be made, for example, so as not to overwhelm the user with too many advertisements. In some implementations, presentation of the first content item can be deferred to at least the second logical page, so as to establish user interest in the content of the resource before, for example, the first advertisement is presented.

In some implementations, selection and presentation of content items can include sizes and formats other than the examples of content items 134d-134f shown in FIG. 2B. For example, banner, skyscraper, and other types, sizes and shapes of content items can be used in combination with the content items 134d-134f. In some implementations, presentation rules can include selecting different formats of content items, e.g., so a user presented with a long article can view content items that include combinations of text, video and other formats of content items.

In some implementations, content sponsors can be provided with options to adjust bids associated with their content items to include different bids for content items that are selected and presented dynamically, as described herein. For example, a content sponsor can specify a higher bid for a video content item presented on a second logical page, or for other content items that are presented in locations in an article that are more or less likely to have a user interaction.

Figure 3:
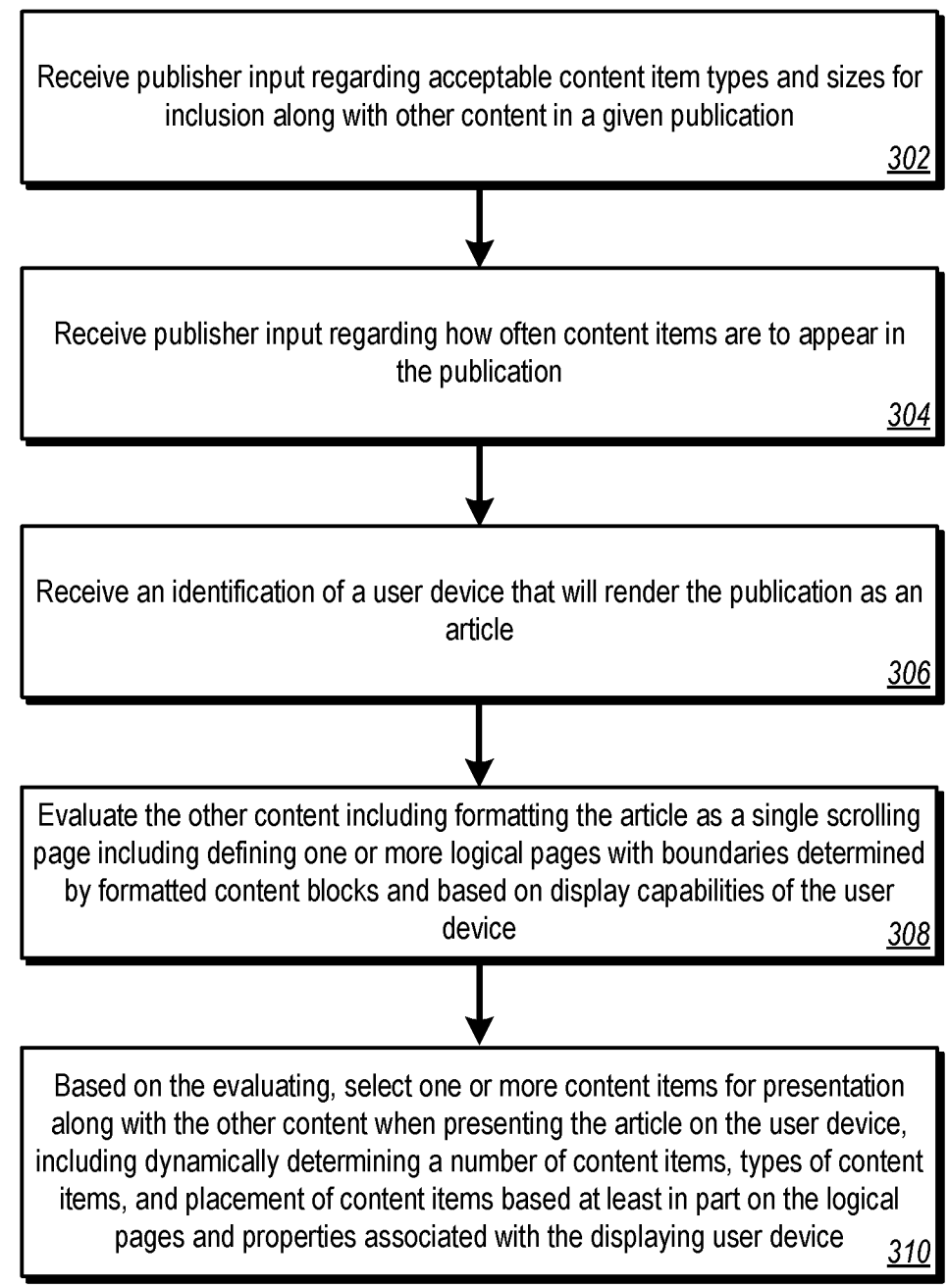
FIG. 3 is a flowchart of an example process for dynamically selecting content items for presentation with a resource.

FIG. 3 is a flowchart of an example process 300 for dynamically selecting content items for presentation with a resource. In some implementations, the content management system 110 can perform stages of the process 300 using instructions that are executed by one or more processors. FIGS. 1-2B are used to provide example structures for performing the steps of the process 300.

Publisher input is received regarding acceptable content item types and sizes for inclusion along with other content in a given publication (302). The publisher preferences engine 121, for example, can receive publisher input 202 regarding acceptable content item types and sizes for inclusion along with other content in a given publication. The publisher input 202 can specify types and sizes of eligible content items 134 (e.g., advertisements) that are to be included with the publisher resource 132a. These and other publisher inputs that are received by the content management system 110 can be stored, for example, in the in publisher preferences 131.

In some implementations, the acceptable content types can include full-page content items, banner content items, or one or more predetermined sizes of rectangle content items. For example, publisher input received regarding acceptable content item types can indicate whether a particular resource 132 is to allow content items (e.g., advertisements) that occupy an entire screen on a given user device 106, an entire width (e.g., for banner advertisements), an entire height (e.g., for skyscraper advertisements), or various sizes of rectangular advertisements. In some implementations, the publisher inputs can be based on, or selected from, recommended advertisement unit sizes provided in a publisher interface, and/or publishers can designate other sizes. Other shapes and sizes are possible.

In some implementations, the full-page content items can include plural different-sized items including ones sized for mobile telephones or tablet devices when configured in portrait or landscape orientation. For example, recommended and/or selected sizes can include proportional sizes with associated aspect ratios that are known to work well with certain types of user devices. In some implementations, the sizes can include different combinations of height-times-width numbers of pixels that work well on mobile telephones, tablet devices, and/or other user devices when configured in landscape or portrait mode.

Publisher input is received regarding how often content items are to appear in the publication (304). As an example, the publisher preferences engine 121 can receive publisher input 204 specifying numerical conditions for providing content items (e.g., advertisements) with the resource 132a, e.g., whenever the resource 132a is presented to a new user.

In some implementations, the publisher input can include publisher input designating how many content items are to be included per article and how often content items should be included with a given article, wherein how often is less than every article. As an example, the publisher input can include a number of advertisements are to be included in the publication, including a separate publisher input advertisement-inclusion frequency designating when content items are to appear in the publication. The advertisement-inclusion frequency can indicate, for example, that every presentation of the resource is to include advertisements, or that advertisements are to be included in every second, third or some other presentation pattern.

An identification is received of a user device that will render the publication as an article (306). For example, the device identification engine 122 can identify the user device 106a as the user device that will render the resource 132a as an article. The device identification engine 122 can use the identification of the user device 106a, and more specifically the type of the device, to look up information in the device capabilities 133. The information that is looked up can be used to determine, for example, how many pages the resource 132a will occupy on the user device 106a based on the associated device type.

The other content is evaluated, including formatting the article as a single scrolling page (308). Formatting the article can include defining one or more logical pages with boundaries determined by formatted content blocks and based on display capabilities of the user device. For example, the resource evaluation engine 123 can evaluate and format the resource 132a into logical pages 210a-210c having boundaries 212, e.g., representing page breaks in a presentation of the article on a given device. The boundaries 212 can be determined by formatted content blocks, e.g. the portions of the resource 132a that will fit in each of the logical pages 210a-210c based on device type-specific display capabilities the user device 106a.

In some implementations, evaluating the other content can include determining that the number of logical pages is less than a first threshold. For example, the resource evaluation engine 123 can determine that the resource 132a, when presented on the user device 106a, will occupy less than a threshold of two logical pages 210a-210b, when presented as an article on the user device 106a.

In some implementations, evaluating the other content can include determining that the number of content items should be only one, and that the content item should be placed at an end of the other content on a last page. For example, the resource evaluation engine 123 can determine that only one of the content items 134 should be presented with resource 132a (if to be presented as two logical pages, as opposed to three, as shown in FIG. 2A). In this example, the resource evaluation engine 123 can determine that a banner advertisement should be placed at the bottom of the second page (e.g., the logical page 210b). Other presentations are possible, including different types, numbers and placements of content items, including ones that depend on device type and orientation.

In some implementations, evaluating the other content can include determining that the number of logical pages is more than a predetermined first minimum number, and the process 300 can further include determining a size associated with a display of the user device. For example, the resource evaluation engine 123 can determine that the number of logical pages for the resource 132a is greater than two. When this determination is made, for example, the size of the user device on which the resource 132a is to be presented can be determined. The determined size, for example, can be dependent on the width of the screen of the user device and whether the mode is landscape or portrait. In some implementations, when the determined size is less than a predetermined threshold, for example, selecting content items can include selecting content items that are full-width (e.g., content item 134c). In another example, when the determined size is greater than the predetermined size, content items can be selected that are less than full width (e.g., content item 134b).

In some implementations, when selecting content items that are less than full width, the process 300 can further include dynamically determining a placement of the content items including locating the content items in different positions on pages of the article. For example, as shown in FIG. 2B, when content items 134d-134f are selected, the content items 134d-134f can be presented in different places on the resource 132b.

In some implementations, the different positions can alternate on consecutive pages where content items are shown. For example, as shown in FIG. 2B, the placement of content items 134d-134f alternates left, right and left.

In some implementations, dynamically determining a placement can include shifting horizontally or vertically each content item placement on respective pages depending on a formatting or type of content that surrounds the content item. For example, content items can be shifted to other positions within a logical page so as to provide a visual balance of all presented content on the logical place. As an example, a rectangular advertisement can be shifted to the left-to-right center of a logical page if content (e.g., full-width images) occupies the full width of the logical page.

In some implementations, evaluating the other content can include determining that the number of logical pages is more than a predetermined second minimum number, and the method further comprising selecting an interstitial content item based on a size and aspect ratio of a display associated with the user device to optimally match the user device. For example, to retain user interest and to maintain a good user experience on longer articles (e.g., over eight or some other threshold number of logical pages), the content management system 110 can select interstitial advertisements that may appear briefly and may include text, graphics or animation. In some implementations, interstitial advertisements, for example, can be full-width advertisements that start on the third logical page of an article and repeat every N (e.g., eight) pages thereafter for small devices and every M (e.g., three) pages thereafter for tablet computers, e.g., for a maximum of three advertisements.

In some implementations, formatting the article as a single scrolling page can include formatting the article as a single vertically scrolling page. Also, one or more logical pages can be defined include defining content blocks in the other content which define content that is not to be separated on different pages, and the number of logical pages can be determined based on the defined content blocks and the user device's display size and capabilities. For example, when the content of a resource is divided into logical pages, mechanisms can be used to ensure that paragraphs are not broken and that captions and headers are kept with their corresponding content elements.

Based on the evaluating, one or more content items are selected for presentation along with the other content when presenting the article on the user device (310). Selecting the content items can include dynamically determining a number of content items, types of content items, and placement of content items based at least in part on the logical pages and properties and or capabilities associated with the displaying user device. For example, the content item selection engine 124 can select one or more content items for presentation along with the resource 132a. The selection can be made, for example, based on the evaluation of the resource 132a and to combine content of the resource 132 with the content items 134a-134c for presentation of the resource as an article on the user device 106a. Selecting the content items can include dynamically determining a number of content items, types of content items, and placement of content items based at least in part on the logical pages 210a-210c and properties associated with the displaying user device 106a. The content item selection engine 124 can select content items from among eligible content items 134.

In some implementations, dynamically determining the type of content items can further include determining only one type of content item per article. For example, using presentation rules and/or publisher preferences, content items 134a-134c can be limited to a single, specific type of content, e.g., solely using rectangular advertisements, or advertisements of a specific size.

In some implementations, the process 300 can further include providing the selected one or more content items for presentation along with the other content on the user device. For example, the content management system 110 can provide the resource 132a (e.g., with the content items 134a-134c) to the user device 106a for presentation in a browser. In some implementations, providing the resource 132a together with the content items 134a-134c can be made as a single response to a request by the user device 106a for the resource 132, e.g., when a user using the device 106a navigates to the corresponding publisher web page.

Figure 4:
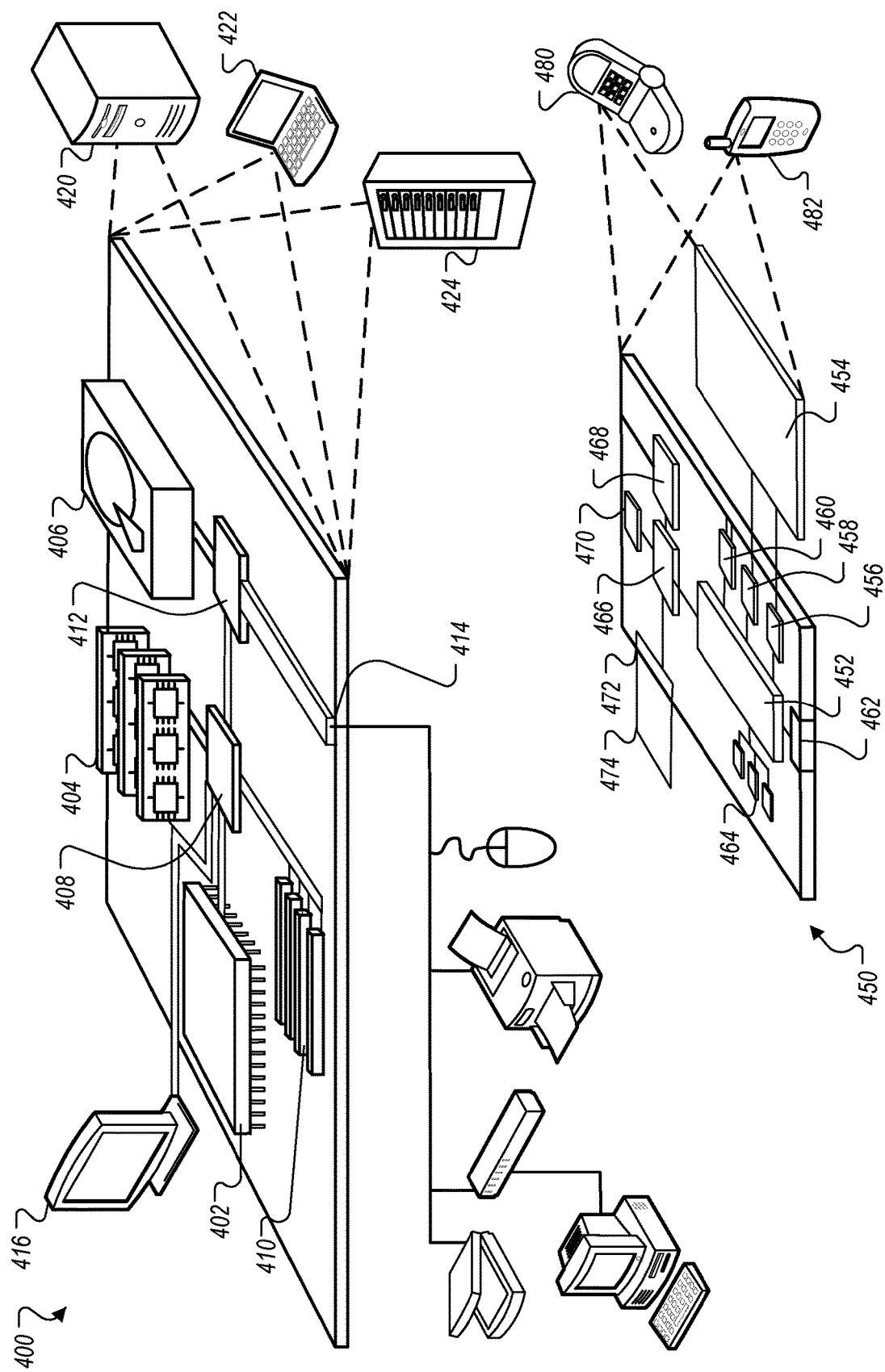
FIG. 4 is a block diagram of an example computer system that can be used to implement the methods, systems and processes described in this disclosure.

FIG. 4 is a block diagram of example computing devices 400, 450 that may be used to implement the systems and methods described in this document, as either a client or as a server or plurality of servers. Computing device 400 is intended to represent various forms of digital computers, such as laptops, desktops, workstations, personal digital assistants, servers, blade servers, mainframes, and other appropriate computers. Computing device 400 is further intended to represent any other typically non-mobile devices, such as televisions or other electronic devices with one or more processors embedded therein or attached thereto. Computing device 450 is intended to represent various forms of mobile devices, such as personal digital assistants, cellular telephones, smartphones, and other computing devices. The components shown here, their connections and relationships, and their functions, are meant to be examples only, and are not meant to limit implementations of the inventions described and/or claimed in this document.

Computing device 400 includes a processor 402, memory 404, a storage device 406, a high-speed controller 408 connecting to memory 404 and high-speed expansion ports 410, and a low-speed controller 412 connecting to low-speed bus 414 and storage device 406. Each of the components 402, 404, 406, 408, 410, and 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as display 416 coupled to high-speed controller 408. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 404 stores information within the computing device 400. In one implementation, the memory 404 is a computer-readable medium. In one implementation, the memory 404 is a volatile memory unit or units. In another implementation, the memory 404 is a non-volatile memory unit or units.

The storage device 406 is capable of providing mass storage for the computing device 400. In one implementation, the storage device 406 is a computer-readable medium. In various different implementations, the storage device 406 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 404, the storage device 406, or memory on processor 402.

The high-speed controller 408 manages bandwidth-intensive operations for the computing device 400, while the low-speed controller 412 manages lower bandwidth-intensive operations. Such allocation of duties is an example only. In one implementation, the high-speed controller 408 is coupled to memory 404, display 416 (e.g., through a graphics processor or accelerator), and to high-speed expansion ports 410, which may accept various expansion cards (not shown). In the implementation, low-speed controller 412 is coupled to storage device 406 and low-speed bus 414. The low-speed bus 414 (e.g., a low-speed expansion port), which may include various communication ports (e.g., USB, Bluetooth®, Ethernet, wireless Ethernet), may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. It may also be implemented as part of a rack server system 424. In addition, it may be implemented in a personal computer such as a laptop computer 422. Alternatively, components from computing device 400 may be combined with other components in a mobile device (not shown), such as computing device 450. Each of such devices may contain one or more of computing devices 400, 450, and an entire system may be made up of multiple computing devices 400, 450 communicating with each other.

Computing device 450 includes a processor 452, memory 464, an input/output device such as a display 454, a communication interface 466, and a transceiver 468, among other components. The computing device 450 may also be provided with a storage device, such as a micro-drive or other device, to provide additional storage. Each of the components 450, 452, 464, 454, 466, and 468, are interconnected using various buses, and several of the components may be mounted on a common motherboard or in other manners as appropriate.

The processor 452 can process instructions for execution within the computing device 450, including instructions stored in the memory 464. The processor may also include separate analog and digital processors. The processor may provide, for example, for coordination of the other components of the computing device 450, such as control of user interfaces, applications run by computing device 450, and wireless communication by computing device 450.

Processor 452 may communicate with a user through control interface 458 and display interface 456 coupled to a display 454. The display 454 may be, for example, a TFT LCD display or an OLED display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may be provided in communication with processor 452, so as to enable near area communication of computing device 450 with other devices. External interface 462 may provide, for example, for wired communication (e.g., via a docking procedure) or for wireless communication (e.g., via Bluetooth® or other such technologies).

The memory 464 stores information within the computing device 450. In one implementation, the memory 464 is a computer-readable medium. In one implementation, the memory 464 is a volatile memory unit or units. In another implementation, the memory 464 is a non-volatile memory unit or units. Expansion memory 474 may also be provided and connected to computing device 450 through expansion interface 472, which may include, for example, a subscriber identification module (SIM) card interface. Such expansion memory 474 may provide extra storage space for computing device 450, or may also store applications or other information for computing device 450. Specifically, expansion memory 474 may include instructions to carry out or supplement the processes described above, and may include secure information also. Thus, for example, expansion memory 474 may be provide as a security module for computing device 450, and may be programmed with instructions that permit secure use of computing device 450. In addition, secure applications may be provided via the SIM cards, along with additional information, such as placing identifying information on the SIM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 464, expansion memory 474, or memory on processor 452.

Computing device 450 may communicate wirelessly through communication interface 466, which may include digital signal processing circuitry where necessary. Communication interface 466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through transceiver 468 (e.g., a radio-frequency transceiver). In addition, short-range communication may occur, such as using a Bluetooth®, WiFi, or other such transceiver (not shown). In addition, GPS receiver module 470 may provide additional wireless data to computing device 450, which may be used as appropriate by applications running on computing device 450.

Computing device 450 may also communicate audibly using audio codec 460, which may receive spoken information from a user and convert it to usable digital information. Audio codec 460 may likewise generate audible sound for a user, such as through a speaker, e.g., in a handset of computing device 450. Such sound may include sound from voice telephone calls, may include recorded sound (e.g., voice messages, music files, etc.) and may also include sound generated by applications operating on computing device 450.

The computing device 450 may be implemented in a number of different forms, as shown in the figure. For example, it may be implemented as a cellular telephone 480. It may also be implemented as part of a smartphone 482, personal digital assistant, or other mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. Other programming paradigms can be used, e.g., functional programming, logical programming, or other programming. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
   receiving, by one or more processors, a request for content, the request including a device identifier identifying a device on which the content is to be presented;
   identifying, by one or more processors, a plurality of content blocks according to which an article is to be formatted into a plurality of logical pages;
   formatting, by the one or more processors, the article into the plurality of logical pages, each logical page including one or more respective content blocks of the plurality of content blocks;
   determining, using the device identifier, a size of the display of the device on which the content is to be presented;

19 selecting, for the plurality of logical pages, a plurality of content items for presentation along with respective content blocks included in the plurality of logical pages, including dynamically determining placement of the content items in the plurality of logical pages based on the size of the display of the device on which the content is to be presented wherein dynamically determining the placement of the content items includes determining that following a placement of a first of the plurality of content items, a respective other of the content items will be placed every predetermined number of pages, the predetermined number based on the size of the display of the device on which the content is to be presented.

2. The method of claim 1 further comprising providing the selected content items for presentation along with respective content blocks included in the plurality of logical pages.

3. The method of claim 1 wherein the content items include a full-page content item, a banner content item or a rectangular content item with a predetermined size.

4. The method of claim 3 wherein the content items include the full-page content item, and the full-page content item includes a plurality of different-sized items including ones sized for mobile telephones or tablet devices when configured in portrait or landscape orientation.

5. The method of claim 1 wherein formatting includes formatting the article into the plurality of logical pages, and defining content blocks as content that is not to be separated into different logical pages and determining a number of logical pages based on the defined content blocks and the size of the display of the device on which the content is to be presented.

6. The method of claim 1 wherein formatting includes determining that a number of logical pages is less than a first threshold, and wherein formatting includes determining that one of the content items should be placed at an end of the content associated with the publication on a last page.

7. The method of claim 1 wherein formatting includes determining that a number of the one or more logical pages is more than a predetermined first minimum number, and wherein selecting includes:

selecting content items that are full-width responsive to determining that the determined size of the display of the device on which the content is to be presented is less than a predetermined threshold, and selecting content items that are less than full-width responsive to determining that the determined size of the display of the device on which the content is to be presented is greater than the predetermined threshold.

8. The method of claim 7 further comprising selecting content items that are less than full-width and dynamically determining a placement of the content items including locating the content items in different positions on the one or more logical pages.

9. The method of claim 8 wherein the different positions alternate on consecutive logical pages where content items are shown.

10. The method of claim 8 wherein dynamically determining a placement includes shifting horizontally or vertically each content item placement on respective logical pages depending on a formatting or type of content that surrounds the content item.

11. The method of claim 1 wherein formatting includes determining that a number of the one or more logical pages is more than a predetermined minimum number, and the method further comprising selecting an interstitial content item based on the size and an aspect ratio of the display of the device on which the content is to be presented to match the user device.

12. The method of claim 1 further comprises dynamically determining to include only one type of content item for the article.

13. A computer program product embodied in a non-transitive computer-readable medium including instructions, that when executed, cause one or more processors to:

receive a request for content, the request including a device identifier identifying a device on which the content is to be presented;

identify a plurality of content blocks according to which an article is to be formatted into a plurality of logical pages;

format the article into the plurality of logical pages, each logical page including one or more respective content blocks of the plurality of content blocks;

determine, using the device identifier, a size of the display of the device on which the content is to be presented; and select, for the plurality of logical pages, one or more content items for presentation along with respective content blocks included in the plurality of logical pages, including dynamically determining a number of content items, types of content items, and placement of content items in the plurality of logical pages based on the plurality of logical pages and the size of the display of the device on which the content is to be presented properties associated with the device on which the content is to be presented, wherein dynamically determining the placement of the content items includes determining that following a placement of a first of the plurality of content items, a respective other of the content items will be placed every predetermined number of pages, the predetermined number based on the size of the display of the device on which the content is to be presented.

14. A system comprising:

one or more processors; and a memory storing computer code instructions, the computer code instructions when executed by the one or more processors cause the one or more processors to:

receive a request for content, the request including a device identifier identifying a device on which the content is to be presented;

identify a plurality of content blocks according to which an article is to be formatted into a plurality of logical pages;

format the article into the plurality of logical pages, each logical page including one or more respective content blocks of the plurality of content blocks;

determine, using the device identifier, a size of the display of the device on which the content is to be presented; and select, for the plurality of logical pages, one or more content items for presentation along with respective content blocks included in the plurality of logical pages, including dynamically determining a number of content items, types of content items, and placement of content items in the plurality of logical pages based on the plurality of logical pages and the size of the display of the device on which the content is to be presented properties associated with the device on which the content is to be presented, wherein dynamically determining the placement of the content items includes determining that following a placement of a first of the plurality of content items, a respective other of the content items will be placed every predetermined number of pages, the predetermined number based on the size of the display of the device on which the content is to be presented.

15. The system of claim 14 wherein in formatting the article, the computer code instructions when executed by the one or more processors cause the one or more processors to:
format the article into a plurality of logical pages;
define content blocks as content that is not to be separated into different logical pages and determining a number of logical pages based on the defined content blocks; and
determine a number of logical pages based on the defined content blocks and the size of the display of the device on which the content is to be presented.

16. The system of claim 14, wherein the computer code instructions when executed by the one or more processors cause the one or more processors to:
determine that a number of the one or more logical pages is more than a predetermined first minimum number; and
select content items that are full-width when the determined size of the display of the device on which the content is to be presented is less than a predetermined threshold, and select content items that are less than full-width when the determined size of the display of the device on which the content is to be presented is greater than the predetermined threshold.

17. The system of claim 16 wherein the computer code instructions when executed by the one or more processors cause the one or more processors to:
dynamically determine a placement of the content items including locating the content items in different positions on the one or more logical pages, when selecting content items that are less than full-width.

18. The system of claim 17 wherein the different positions alternate on consecutive logical pages where content items are shown.

19. The system of claim 18 wherein the computer code instructions when executed by the one or more processors cause the one or more processors to:
shift, when dynamically determining a placement, horizontally or vertically each content item placement on respective logical pages depending on a formatting or type of content that surrounds the content item.

20. The system of claim 14 wherein the computer code instructions when executed by the one or more processors cause the one or more processors to:
determine that a number of the one or more logical pages is more than a predetermined second minimum number; and
select an interstitial content item based on the size and an aspect ratio of the display of the device on which the content is to be presented to match the user device.

* * * * *